United States Patent [19]

Welborn, Jr.

[11] Patent Number: 4,808,561

[45] Date of Patent: Feb. 28, 1989

[54] SUPPORTED POLYMERIZATION CATALYST

[75] Inventor: Howard C. Welborn, Jr., Houston, Tex.

[73] Assignee: Exxon Chemical Patents Inc., Linden, N.J.

[21] Appl. No.: 170,485

[22] Filed: Mar. 18, 1988

Related U.S. Application Data

[63] Continuation of Ser. No. 747,615, Jun. 21, 1985, abandoned.

[51] Int. Cl.$^4$ .............................. C08F 4/64; C08F 4/68
[52] U.S. Cl. ....................................... 502/104; 502/103; 502/113; 502/117; 502/118; 502/120; 502/129; 502/132; 502/133; 526/129
[58] Field of Search ............... 502/103, 104, 117, 120, 502/113, 118, 129, 132, 133

[56] References Cited

U.S. PATENT DOCUMENTS

| | | |
|---|---|---|
| 2,981,725 | 4/1961 | Luft et al. |
| 3,166,542 | 1/1965 | Orzechowski et al. |
| 4,056,668 | 11/1977 | Berger et al. |
| 4,133,944 | 1/1979 | Cooper et al. |
| 4,530,914 | 7/1985 | Ewen et al. ........................ 502/113 |
| 4,542,199 | 9/1985 | Kaminsky et al. |
| 4,564,647 | 1/1986 | Hayashi et al. |
| 4,752,597 | 6/1988 | Turner ........................ 502/117 X |

FOREIGN PATENT DOCUMENTS 2608865 9/1973 Fed. Rep. of Germany.
1108610 5/1986 Japan.

OTHER PUBLICATIONS

Kaminsky, Preparation of Special Polyolefins from Soluble Zirconium Compounds with Alumoxane as Cocatalyst, pp. 293–304 (1986 Elsevier).
Kaminsky, Polymerization and Copolymerization With a Highly Active, Soluble Ziegler–Natta Catalyst, pp. 225–244, 8/17/81, Midland Macromolecular Inst.
Sinn et al., Living Polymers on Polymerization With Extremely Productive Ziegler Catalysts, Agnew. Chem. Int. Ed., Engl. (1980), No. 5, p. 392.
Giannetti, Homogeneous Ziegler–Natta Catalysis II Ethylene Polymerization by IV B Transition Metal Complexes/Alumoxane, pp. 2117–2133, (1985).

*Primary Examiner*—Patrick P. Garvin
*Attorney, Agent, or Firm*—M. B. Kurtzman

[57] ABSTRACT

An olefin polymerization supported catalyst comprising a support and the reaction product of a metallocene of Group 4b, 5b or 6b of the Periodic Table and an alumoxane, said reaction product formed in the presence of a support.

16 Claims, No Drawings

SUPPORTED POLYMERIZATION CATALYST

This is a continuation of application Ser. No. 747,615, filed 6/21/85 and now abandoned.

This invention relates to a new, improved catalyst useful for the polymerization and copolymerization of olefins and particularly useful for the polymerization of ethylene and copolymerization of ethylene with 1-olefins having 3 or more carbon atoms such as, for example, propylene, i-butene, 1-butene, 1-pentene, 1-hexene, and 1-octene; dienes such as butadiene, 1,7-octadiene, and 1,4-hexadiene or cyclic olefins such as norbornene. The invention particularly relates to a new and improved heterogeneous transition metal containing supported catalyst which can be employed without the use of an organometallic cocatalyst in the polymerization of olefins. The invention further generally relates to a process for polymerization of ethylene alone or with other 1-olefins or diolefins in the presence of the new supported transition metal containing catalyst comprising the reaction product of a metallocene and an alumoxane in the presence of a support material such as silica.

DESCRIPTION OF THE PRIOR ART

Traditionally, ethylene and 1-olefins have been polymerized or copolymerized in the presence of hydrocarbon insoluble catalyst systems comprising a transition metal compound and an aluminum alkyl. More recently, active homogeneous catalyst systems comprising a bis(cyclopentadienyl)titanium dialkyl or a bis(cyclopentadienyl)zirconium dialkyl, an aluminum trialkyl and water have been found to be useful for the polymerization of ethylene. Such catalyst systems are generally referred to as "Ziegler-type catalysts".

German Patent Application No. 2,608,863 disloses the use of a catalyst system for the polymerization of ethylene consisting of bis(cyclopentadienyl) titanium dialkyl, aluminum trialkyl and water.

German Patent Application No. 2,608,933 discloses an ethylene polymerization catalyst system consisting of zirconium metallocenes of the general formula (cyclopentadienyl)$_n$ZrY$_{4-n}$, wherein n stands for a number in the range of 1 to 4, Y for R, CH$_2$AlR$_2$, CH$_2$CH$_2$AlR$_2$ and CH$_2$CH(AlR$_2$)$_2$, wherein R stands for alkyl or metallo alkyl, and an aluminum trialkyl cocatalyst and water.

European Patent Application No. 0035242 discloses a process for preparing ethylene and atactic propylene polymers in the presence of a halogen-free Ziegler catalyst system of (1) cyclopentadienyl compound of the formula (cyclopentadienyl)$_n$MeY$_{4-n}$ in which n is an integer from 1 to 4, Me is a transition metal, especially zirconium, and Y is either hydrogen, a C$_1$-C$_5$ alkyl or metallo alkyl group or a radical having the following general formula CH$_2$AlR$_2$, CH$_2$CH$_2$AlR$_2$ and CH$_2$CH(AlR$_2$)$_2$ in which R represents a C$_1$-C$_5$ alkyl or metallo alkyl group, and (2) an alumoxane.

Additional teachings of homogeneous catalyst systems comprising a metallocene and alumoxane are European Patent Application No. 0069951 of Kaminsky et al, U.S. Pat. No. 4,404,344 issued Sept. 13, 1983 of Sinn et al., and U.S. application Ser. Nos. 697,308 filed Feb. 1, 1985, 501,588 filed May 27, 1983 and now U.S. Pat. No. 4,522,982, 728,111 filed Apr. 29, 1985 and 501,740 filed June 6, 1983 and now U.S. Pat. No. 4,530,914, each commonly assigned to Exxon Research and Engineering Company.

An advantage of the metallocene alumoxane homogeneous catalyst system is the very high activity obtained for ethylene polymerization. Another significant advantage is, unlike olefin polymers produced in the presence of conventional heterogeneous Ziegler catalysts, terminal unsaturation is present in polymers produced in the presence of these homogeneous catalysts. Nevertheless, the catalysts suffer from a disadvantage, that is, the ratio of alumoxane to metallocene is high, for example in the order of 1,000 to 1 or greater. Such voluminous amounts of alumoxane would require extensive treatment of polymer product obtained in order to remove the undesirable aluminum. A second disadvantage, of the homogeneous catalyst system which is also associated with traditional heterogeneous Ziegler catalysts, is the multiple of delivery systems required for introducing the individual catalyst components into the polymerization reactor.

It would be highly desirable to provide a metallocene based catalyst which is commercially useful for the polymerization of olefins wherein the aluminum to transition metal ratio is within respectable ranges and further to provide a polymerization catalyst which does not require the presence of a cocatalyst thereby reducing the number of delivery systems for introducing catalyst into polymerization reactor.

SUMMARY OF THE INVENTION

In accordance with the present invention, a new metallocene/alumoxane catalyst is provided for olefin polymerization which catalyst can be usefully employed for the production of low, medium and high density polyethylenes and copolymers of ethylene with alphaolefins having 3 to 18 or more carbon atoms and/or diolefins having up to 18 carbon atoms or more.

The new catalyst provided in accordance with one embodiment of this invention, comprises the reaction product of at least one metallocene and an alumoxane in the presence of a support material thereby providing a supported metallocene-alumoxane reaction product as the sole catalyst component.

The supported reaction product will polymerize olefins at commercially respectable rates without the presence of the objectionable excess of alumoxane as required in the homogenous system.

In yet another embodiment of this invention there is provided a process for the polymerization of ethylene and other olefins, and particularly homopolymers of ethylene and copolymers of ethylene and higher alphaolefins and/or diolefins and/or cyclic olefins such as norbornene in the presence of the new catalysts.

The metallocenes employed in the production of the reaction product on the support are organometallic coordination compounds which are cyclopentadienyl derivatives of a Group 4b, 5b, or 6b metal of the Periodic Table (56th Edition of Handbook of Chemistry and Physics, CRC Press [1975]) and include mono, di and tricyclopentadienyls and their derivatives of the transition metals. Particularly desirable are the metallocene of a Group 4b and 5b metal such as titanium, zirconium, hafnium and vanadium. The alumoxanes employed in forming the reaction product with the metallocenes are themselves the reaction products of an aluminum trialkyl with water.

The alumoxanes are well known in the art and comprise oligomeric linear and/or cyclic alkyl alumoxanes represented by the formula:

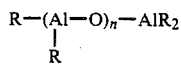  (I)

for oligomeric, linear alumoxanes and

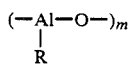  (II)

for oligomeric, cyclic alumoxane, wherein n is 1–40, preferably 10–20, m is 3–40, preferably 3–20 and R is a $C_1$–$C_8$ alkyl group and preferably methyl. Generally, in the preparation of alumoxanes from, for example, aluminum trimethyl and water, a mixture of linear and cyclic compounds is obtained.

The alumoxanes can be prepared in a variety of ways. Preferably, they are prepared by contacting water with a solution of aluminum trialkyl, such as, for example, aluminum trimethyl, in a suitable organic solvent such as benzene or an aliphatic hydrocarbon. For example, the aluminum alkyl is treated with water in the form of a moist solvent. In a preferred method, the aluminum alkyl, such as aluminum trimethyl, can be desirably contacted with a hydrated salt such as hydrated ferrous sulfate. The method comprises treating a dilute solution of aluminum trimethyl in, for example, toluene with ferrous sulfate heptahydrate.

PREFERRED EMBODIMENTS

Briefly, the transition metal containing catalyst of the present invention is obtained by reacting an alumoxane and a metallocene in the presence of a solid support material. The supported reaction product can be employed as the sole catalyst component for the polymerization of olefins or, in the alternative, it can be employed with a organometallic cocatalyst.

Typically, the support can be any of the solid, particularly, porous supports such as talc, inorganic oxides, and resinous support materials such as polyolefin. Preferably, the support material is an inorganic oxide in finely divided form.

Suitable inorganic oxide materials which are desirably employed in accordance with this invention include Group 2a, 3a, 4a or 4b metal oxides such as silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the alumoxane or transition metal compound first added to the reaction solvent. Prior to use, the inorganic oxide support is dehydrated, i. e., subjected to a thermal treatment in order to remove water and reduce the concentration of the surface hydroxyl groups. The treatment is carried out in vacuum or while purging with a dry inert gas such as nitrogen at a temperature of about 100° C. to about 1000° C., and preferably, from about 300° C. to about 800° C. Pressure considerations are not critical. The duration of the thermal treatment can be from about 1 to about 24 hours. However, shorter or longer times can be employed provided equilibrium is established with the surface hydroxyl groups.

Chemical dehydration as an alternative method of dehydration of the metal oxide support material can advantageously be employed. Chemical dehydration converts all water and hydroxyl groups on the oxide surface to inert species. Useful chemical agents are for example, $SiCl_4$; chlorosilanes, such as trimethylchlorosilane, dimethylaminotrimethylsilane and the like. The chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. The solution is added slowly to the slurry. The temperature ranges during chemical dehydration reaction can be from about 25° C. to about 120° C., however, higher and lower temperatures can be employed. Preferably, the temperature will be about 50° C. to about 70° C. The chemical dehydration procedure should be allowed to proceed until all the moisture is removed from the particulate support material, as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The normally hydrocarbon soluble metallocenes and alumoxanes are converted to a heterogeneous supported catalyst by depositing said metallocenes and alumoxanes on the dehydrated support material. The order of addition of the metallocene and alumoxane to the support material can vary. For example, the metallocene (neat or dissolved in a suitable hydrocarbon solvent) can be first added to the support material followed by the addition of the alumoxane; the alumoxane and metallocene can be added to the support material simultaneously; the alumoxane can be first added to the support material followed by the addition of the metallocene. In accordance with the preferred embodiment of this invention the alumoxane dissolved in a suitable inert hydrocarbon solvent is added to the support material slurried in the same or other suitable hydrocarbon liquid and thereafter the metallocene is added to the slurry.

The treatment of the support material, as mentioned above, is conducted in an inert solvent. The same inert solvent or a different inert solvent is also employed to dissolve the metallocenes and alumoxanes. Preferred solvents include mineral oils and the various hydrocarbons which are liquid at reaction temperatures and in which the individual ingredients are soluble. Illustrative examples of useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene. Preferably the support material is slurried in toluene and the metallocene and alumoxane are dissolved in toluene prior to addition to the support material. The amount of solvent to be employed is not critical. Nevertheless, the amount should be employed so as to provide adequate heat transfer away from the catalyst components during reaction and to permit good mixing.

The supported catalyst of this invention is prepared by simply adding the reactants in the suitable solvent and preferably toluene to the support material slurry, preferably silica slurried in toluene. The ingredients can be added to the reaction vessel rapidly or slowly. The temperature maintained during the contact of the reactants can vary widely, such as, for example, from 0° to 100° C. Greater or lesser temperatures can also be employed. Preferably, the alumoxanes and metallocenes are added to the silica at room temperature. The reaction between the alumoxane and the support material is rapid, however, it is desirable that the alumoxane be contacted with the support material for about one hour up to eighteen hours or greater. Preferably, the reaction is maintained for about one hour. The reaction of the alumoxane, the metallocene and the support material is evidenced by its exothermic nature and a color change.

At all times, the individual ingredients as well as the recovered catalyst component are protected from oxygen and moisture. Therefore, the reactions must be performed in an oxygen and moisture free atmosphere and recovered in an oxygen and moisture free atmosphere. Preferably, therefore, the reactions are performed in the presence of an inert dry gas such as, for example, nitrogen. The recovered solid catalyst is maintained in a nitrogen atmosphere.

Upon completion of the reaction of the metallocene and alumoxane with the support, the solid material can be recovered by any well-known technique. For example, the solid material can be recovered from the liquid by vacuum evaporation or decantation. The solid is thereafter dried under a stream of pure dry nitrogen or dried under vacuum.

The amount of alumoxane and metallocene usefully employed in preparation of the solid supported catalyst component can vary over a wide range. The concentration of the alumoxane added to the essentially dry, support can be in the range of about 0.1 to about 10 mmoles/g of support, however, greater or lesser amounts can be usefully employed. Preferably, the alumoxane concentration will be in the range of 0.5 to 10 mmoles/g of support and especially 1 to 5 mmoles/g of support. The amount of metallocene added will be such as to provide an aluminum to transition metal mole ratio of from about 1:1 to about 100:1. Preferably, the ratio is in the range from about 5:1 to about 50:1 and more preferably in the range from about 10:1 to about 20:1. These ratios are significantly less than that which is necessary for the homogeneous system.

The present invention employs at least one metallocene compound in the formation of the supported catalyst. Metallocene, i.e. a cyclopentadienylide, is a metal derivative of a cyclopentadiene. The metallocenes usefully employed in accordance with this invention contain at least one cyclopentadiene ring. The metal is selected from Group 4b, 5b and 6b metal, preferably 4b and 5b metals, preferably titanium, zirconium, hafnium, chromium, and vanadium, and especially titanium and zirconium. The cyclopentadienyl ring can be unsubstituted or contain substituents such as, for example, a hydrocarbyl substituent. The metallocene can contain one, two, or three cyclopentadienyl ring however two rings are preferred.

The preferred metallocenes can be represented by the general formulas:

I. $(Cp)_m MR_n X_q$ wherein Cp is a cyclopentadienyl ring, M is a Group 4b, 5b, or 6b transition metal, R is a hydrocarbyl group or hydrocarboxy having from 1 to 20 carbon atoms, X is a halogen, and m=1–3, n=0–3, q=0–3 and the sum of m+n+q will be equal to the oxidation state of the metal.

II. $(C_5R'_k)_g R''_s (C_5R'_k) MQ_{3-g}$ and

III. $R''_s (C_5R'_k)_2 MQ'$ wherein $(C_5R'_k)$ is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms or two carbon atoms are joined together to form a $C_4$–$C_6$ ring, R" is a $C_1$–$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidiene radical having from 1 to about 20 carbon atoms, s is 0 or 1, g is 0, 1 or 2, s is 0 when g is 0, k is 4 when s is 1 and k is 5 when s is 0, and M is as defined above.

Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like.

Exemplary halogen atoms include chlorine, bromine, fluorine and iodine and of these halogen atoms, chlorine is preferred.

Exemplary hydrocarboxy radicals are methoxy, ethoxy, propoxy, butoxy, amyloxy and the like.

Exemplary of the alkylidiene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide, bis(cyclopentadienyl)zirconium ethyl iodide, bis(cyclopentadienyl)- zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed in accordance with this invention are monocyclopentadienyls titanocenes such as, pentamethylcyclopentadienyl titanium trichloride, pentaethylcyclopentadienyl titanium trichloride; bis(pentamethylcyclopentadienyl) titanium diphenyl, the carbene represented by the formula bis(cyclopentadienyl)titanium=CH$_2$ and derivatives of this reagent such as bis(cyclopentadienyl)Ti=CH$_2$·Al(CH$_3$)$_3$, (Cp$_2$TiCH$_2$)$_2$,

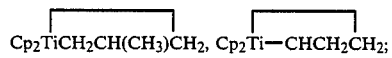

substituted bis(cyclopentadienyl)titanium (IV) compounds such as: bis(indenyl)titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes and the like.

Illustrative but non-limiting examples of the zirconocenes Formula II and III which can be usefully employed in accordance with this invention are, pentamethylcyclopentadienyl zirconium trichloride, pentaethylcyclopentadienyl zirconium trichloride, bis(pentamethylcyclopentadienyl)zirconium diphenyl, the alkyl substituted cyclopentadienes, such as bis(ethyl cyclopentadienyl)zirconium dimethyl, bis($\beta$-phenylpropylcyclopentadienyl)zirconium dimethyl, bis(methylcyclopentadienyl)zirconium dimethyl, bis(n-butyl cyclopentadienyl)zirconium dimethyl, bis(cyclohexylmethylcyclopentadienyl)zirconium dimethyl, bis(n-octyl-cyclopentadienyl)zirconium dimethyl, and haloalkyl and dihalide complexes of the above; di-alkyl, trialkyl, tetra-alkyl, and penta-alkyl cyclopentadienes, such as bis(pentamethylcyclopentadienyl) zirconium dimethyl, bis(1,2-dimethylcyclopentadienyl)zirconium dimethyl and dihalide complexes of the above; silicone, phosphorus, and carbon bridged cyclopentadiene complexes such as dimethylsilyldicyclopentadienyl zirconium dimethyl or dihalide, and methylene dicyclopentadienyl zirconium dimethyl or dihalide, and methylene dicyclopentadienyl zirconium dimethyl or dihalide, carbenes represented by the formula Cp$_2$Zr=CHP(C$_6$H$_5$)$_2$CH$_3$, and derivatives of these compounds such as

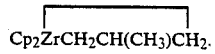

Bis(cyclopentadienyl)hafnium dichloride, bis(cyclopentadienyl)hafnium dimethyl, bis(cyclopentadienyl)vanadium dichloride and the like are illustrative of other metallocenes.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide that it is desirable to employ in preparing the catalyst compositions, as well as affecting the properties of polymers formed with the aid of the catalyst compositions, these characteristics must frequently be taken into consideration in choosing an inorganic oxide for use in a particular aspect of the invention. For example, when the catalyst composition is to be used in a gas-phase polymerization process—a type of process in which it is known that the polymer particle size can be varied by varying the particle size of the support—the inoranic oxide used in preparing the catalyst composition should be one having a particle size that is suitable for the production of a polymer having the desired particle size. In general, optimum results are usually obtained by the use of inorganic oxides having an average particle size in the range of about 30 to 600 microns, preferably about 30 to 100 microns; a surface area of about 50 to 1,000 square meters per gram, preferably about 100 to 400 square meters per gram; and a pore volume of about 0.5 to 3.5 cc per gram; preferably about 0.5 to 2 cc per gram.

The polymerization may be conducted by a solution, slurry, or gas-phase technique, generally at a temperature in the range of about 0°-160° C. or even higher, and under atmospheric, subatmospheric, or superatmospheric pressure conditions; and conventional polymerization adjuvants, such as hydrogen may be employed if desired. It is generally preferred to use the catalyst compositions at a concentration such as to provide about 0.000001–0.005%, most preferably about 0.00001–0.0003%, by weight of transition metal based on the weight of monomer(s), in the polymerization of ethylene, alone or with one or more higher olefins.

A slurry polymerization process can utilize sub- or superatmospheric pressures and temperatures in the range of 40°-110° C. In a slurry polymerization, a suspension of solid, particulate polymer is formed in a liquid polymerization medium to which ethylene, alpha-olefin comonomer, hydrogen and catalyst are added. The liquid employed as the polymerization medium can be an alkane or cycloalkane, such as butane, pentane, hexane, or cyclohexane, or an aromatic hydrocarbon, such as toluene, ethylbenzene or xylene. The medium employed should be liquid under the conditions of the polymerization and relatively inert. Preferably, hexane or toluene is employed.

A gas-phase polymerization process utilizes superatmospheric pressure and temperatures in the range of about 50°-120° C. Gas-phase polymerization can be performed in a stirred or fluidized bed of catalyst and product particles in a pressure vessel adapted to permit the separation of product particles from unreacted gases. Thermostated ethylene, comonomer, hydrogen and an inert diluent gas such as nitrogen can be introduced or recirculated so as to maintain the particles at a temperature of 50°–120° C. Triethylaluminum may be added as needed as a scavenger of water, oxygen, and other adventitious impurities. Polymer product can be withdrawn continuously or semi-continuing at a rate such as to maintain a constant product inventory in the reactor. After polymerization and deactivation of the catalyst, the product polymer can be recovered by any suitable means. In commercial practice, the polymer product can be recovered directly from the gas phase reactor, freed of residual monomer with a nitrogen purge, and used without further deactivation or catalyst removal. The polymer obtained can be extruded into water and cut into pellets or other suitable comminuted shapes. Pigments, antioxidants and other additives, as is known in the art, may be added to the polymer.

The molecular weight of polymer product obtained in accordance with this invention can vary over a wide range, such as low as 500 up to 2,000,000 or higher and preferably 1,000 to about 500,000.

For the production of polymer product having a narrow molecular weight distribution, it is preferable to deposit only one metallocene on to the inert porous support material and employ said support metallocene together with the alumoxane as the polymerization catalyst.

It is highly desirable to have for many applications, such as extrusion and molding processes, polyethylenes which have a broad molecular weight distribution of the unimodal and/or the multimodal type. Such polyethylenes evidence excellent processability, i.e. they can be processed at a faster throughput rate with lower energy requirements and at the same time such polymers would evidence reduced melt flow perturbations. Such polyethylenes can be obtained by providing a catalyst component comprising at least two different metallocenes, each having different propagation and termination rate constants for ethylene polymerizations. Such rate constants are readily determined by one of ordinary skill in the art.

The molar ratio of the metallocenes, such as, for example, of a zirconocene to a titanocene in such catalysts, can vary over a wide range, and in accordance with this invention, the only limitation on the molar ratios is the breadth of the Mw distribution or the degree of bimodality desired in the product polymer. Desirably, the metallocene to metallocene molar ratio will be about 1:100 to about 100:1, and preferably 1:10 to about 10:1.

The present invention also provides a process for producing (co)polyolefin reactor blends comprising polyethylene and copolyethylene-alpha-olefins. The reactor blends are obtained directly during a single polymerization process, i.e., the blends of this invention are obtained in a single reactor by simultaneously polymerizing ethylene and copolymerizing ethylene with an alpha-olefin thereby eliminating expensive blending operations. The process of producing reactor blends in accordance with this invention can be employed in conjunction with other prior art blending techniques, for example, the reactor blends produced in a first reactor can be subjected to further blending in a second stage by use of the series reactors.

In order to produce reactor blends the supported metallocene catalyst component comprises at least two different metallocenes each having different comonomer reactivity ratios.

The comonomer reactivity ratios of the metallocenes in general are obtained by well known methods, such as for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in its entirety by reference. For example, to determine reactivity ratios the most widely used copolymerization model is based on the following equations:

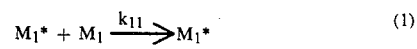  (1)

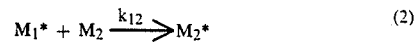  (2)

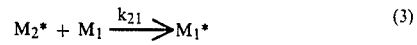  (3)

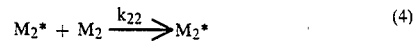  (4)

where $M_1$ refers to a monomer molecule which is arbitrarily designated i (where i=1, 2) and $M_i^*$ refers to a growing polymer chain to which monomer i has most recently attached.

The $k_{ij}$ values are the rate constants for the indicated reactions. In this case, $k_{11}$ represents the rate at which an ethylene unit inserts into a growing polymer chain in which the previously inserted monomer unit was also ethylene. The reactivity rates follow as: $r_1 = k_{11}/k_{12}$ and $r_2 = k_{22}/k_{21}$ wherein $k_{11}$, $k_{12}$, $k_{22}$ and $k_{21}$ are the rate constants for ethylene (1) or comonomer (2) addition to a catalyst site where the last polymerized monomer is ethylene ($k_{1x}$) or comonomer (2) ($k_{2x}$).

Since, in accordance with this invention, one can produce high viscosity polymer product at a relatively high temperature, temperature does not constitute a limiting parameter as with the prior art metallocene/alumoxane catalyst. The catalyst systems described herein, therefore, are suitable for the polymerization of olefins in solution, slurry or gas phase polymerizations and over a wide range of temperatures and pressures. For example, such temperatures may be in the range of about −60° C. to about 280° C. and especially in the range of about 0° C. to about 160° C. The pressures employed in the process of the present invention are those well known, for example, in the range of about 1 to 500 atmospheres, however, higher pressures can be employed.

The polymers produced by the process of this present invention are capable of being fabricated into a wide variety of articles, as is known for homopolymers of ethylene and copolymers of ethylene and higher alpha-olefins.

In a slurry phase polymerization, the alkyl aluminum scavenger is preferably dissolved in a suitable solvent, typically in an inert hydrocarbon solvent such as toluene, xylene, and the like in a molar concentration of about $5 \times 10^{-3}$M. However, greater or lesser amounts can be used.

The present invention is illustrated by the following examples.

EXAMPLES

In the Examples following the alumoxane employed was prepared by adding 76.5 grams ferrous sulfate heptahydrate in 4 equally spaced increments over a 2 hour period to a rapidly stirred 2 liter round-bottom flask containing 1 liter of a 13.1 wt. % solution of trimethyl-aluminum (TMA) in toluene. The flask was maintained at 50° C. and under a nitrogen atmosphere. Methane produced was continuously vented. Upon completion of the addition of ferrous sulfate heptahydrate the flask was continuously stirred and maintained at a temperature of 50° C. for 6 hours. The reaction mixture was cooled to room temperature and was allowed to settle. The clear solution containing the alumoxane was separated by decantation from the insoluble solids. Molecular weights were determined on a Water's Associates Model No. 150C GPC (Gel Permeation Chromatography). The measurements were obtained by dissolving polymer samples in hot trichlorobenzene and filtered. The GPC runs are performed at 145° C. in trichlorobenzene at 1.0 ml/min flow using styragel columns from Perkin Elmer, Inc. 3.1% solutions (300 microliters of trichlorobenzene solution) were injected and the samples were run in duplicate. The integration parameters were obtained with a Hewlett-Packard Data Module.

Catalyst Preparation

Catalyst A 10 grams of a high surface area (Davison 952) silica, dehydrated in a flow of dry nitrogen at 800° C. for 5 hours, was slurried with 50 cc of toluene at 25° C. under nitrogen in a 250 cc round-bottom flask using a magnetic stirrer. 25 cc of methyl alumoxane in toluene (1.03 moles/liter in aluminum) was added dropwise over 5 minutes with constant stirring to the silica slurry. Stirring was continued for 30 minutes while maintaining the temperature at 25° C. at which time the toluene was decanted off and the solids recovered. To the alumoxane treated silica was added dropwise over 5 minutes, with constant stirring 25.0 cc of a toluene solution containing 0.200 gram of dicyclopentadienyl zirconium dichloride. The slurry was stirred an additional ½ hour while maintaining the temperature at 25° C. and thereafter the toluene was decanted and the solids recovered and dried in vacuo for 4 hours. The recovered solid was neither soluble nor extractable in hexane. Analysis of the catalyst indicated that it contained 4.5 wt. % aluminum and 0.63 wt. % zirconium.

Catalyst B

This catalyst will demonstrate that the use of the catalyst of this invention in the production of copolyethylene with 1-butene results in the more efficient incorporation of 1-butene as demonstrated by the polymer product density.

The procedure for the preparation of Catalyst A was followed with the exception that the methylalumoxane treatment of the support material was eliminated. Analysis of the recovered solid indicated that it contained 0.63 wt. % zirconium and 0 wt. % aluminum.

Catalyst C

The procedure for the preparation of Catalyst A was followed except that 0.300 of bis(cyclopentadienyl) zirconium dimethyl was substituted for the bis(cyclopentadienyl) zirconium dichloride. Analysis of the recovered solid indicated that it contained 4.2 wt. % aluminum and 1.1 wt. % zirconium.

Catalyst D

The procedure for preparation of Catalyst A was followed with the exception that 0.270 g of bis(n-butyl-cyclopentadienyl) zirconium dichloride was substituted for the bis(cyclopentadienyl) zirconium dichloride of Catalyst A and all procedures were performed at 80° C. Analysis of the recovered solids indicated that it contained 0.61 wt. zirconium and 4.3 wt. % aluminum.

Catalyst E

The procedure for preparation of Catalyst D was followed with the exception that 0.250 grams of bis(n-butyl-cyclopentadienyl)zirconium dimethyl was substituted for the metallocene dichloride. Analysis of the recovered solid indicated that it contained 0.63 wt % zirconium and 4.2 wt % aluminum.

Catalyst F

The procedure for the preparation of Catalyst D was followed with the exception that 0.500 grams of bis(pentamethylcyclopentadienyl)zirconium dichloride was substituted for the metallocene. Analysis of the recovered solid indicated that it contained 0.65 wt % zirconium and 4.7 wt % aluminum.

EXAMPLE 1—Polymerization—Catalyst A

Polymerization performed in the gas phase in a 1-liter autoclave reactor equipped with a paddle stirrer, an external water jacket for temperature control, a septum inlet and a regulated supply of dry nitrogen, ethylene, hydrogen and 1-butene. The reactor, containing 40.0 g of ground polystyrene (10 mesh) which was added to aid stirring in the gas phase, was dried and degassed thoroughly at 85° C. As a scavenger, 2.00 cc of a methyl alumoxane solution (0.64 molar in total aluminum) was injected through the septum inlet, into the vessel using a gas-tight syringe in order to remove traces of oxygen and water. The reactor contents were stirred at 120 rpm at 85° C. for 1 minute at 0 psig nitrogen pressure. 500.0 mg of Catalyst A was injected into the reactor and the reactor was pressured to 200 psig with ethylene. The polymerization was continued for 10 minutes while maintaining the reaction vessel at 85° C. and 200 psig by constant ethylene flow. The reaction was stopped by rapidly cooling and venting. 12.3 grams of polyethylene were recovered. The polyethylene was recovered by stirring the product with 1 liter of dichloromethane at 40° C., filtering and washing with dichloromethane to recover the insoluble polyethylene product from the soluble polystyrene stirring aid. The polyethylene had a molecular weight of 146,000.

EXAMPLE 2—Polymerization—Catalyst A

Polymerization was performed as in Example 1 in the presence of Catalyst A except that 3.0 psig of hydrogen was pressured into the reactor prior to ethylene injection. 13.2 grams of polyethylene were recovered having a molecular weight of 29,000.

EXAMPLE 3—Polymerization—Catalyst A

Polymerization was performed as in Example 1 in the presence of Catalyst A except that 13.0 cc (0.137 moles) of 1-butene was pressured into the reactor together with the ethylene after the catalyst injection. 13.8 grams of polyethylene were recovered having a molecular weight of 39,000 and a density of 0.918 g/cc.

COMPARATIVE EXAMPLE 3A—Polymerization—Catalyst B

The polymerization was performed as in Example 1 with the exception that Catalyst B was substituted for Catalyst A. 17.3 g of polyethylene were recovered having a molecular weight of 67,000 and a density of 0.935 g/cc. The higher density as compared with that obtained in Example 3 demonstrates the less efficient incorporation of comonomer.

EXAMPLE 4—Polymerization—Catalyst C

Polymerization was performed as in Example 1 with the exception that Catalyst C was used in place of Catalyst A. 9.8 grams of polyethylene were recovered having a molecular weight of 189,000 and a density of 0.960 g/cc.

EXAMPLE 5—Polymerization—Catalyst C

Polymerization was performed as in Example 4 except that 13.0 cc of 1-butene (0.123 moles) and 0.6 psig of hydrogen (1.66 millimoles) was introduced after the catalyst together with the ethylene. 6.5 grams of polyethylene were recovered having a molecular weight of 41,000 and a density of 0.926 g/cc.

EXAMPLE 6—Polymerization—Catalyst C

Polymerization was performed as in Example 4, except that the scavenger methyl alumoxane was eliminated and no other aluminumalkyl scavenger was injected. 10.2 grams of polyethene was recovered having a molecular weight of 120,000 and a density of 0.960 g/cc.

EXAMPLE 7—Polymerization—Catalyst D

Polymerization was performed as in Example 1 with the exception that 0.6 cc of a 25 wt. % triethylaluminum in hexane was substituted for the methylalumoxane solution of Example 1, and Catalyst D was employed in place of Catalyst A. 50.4 g of polyethylene was recovered having a molecular weight of 196,000 and a density of 0.958 g/cc.

EXAMPLE 8—Polymerization—Catalyst D

Polymerization was performed as in Example 1 with the exception that the scavenger, methylalumoxane was eliminated, Catalyst D was employed in place of Catalyst A and the polymerization was stopped at the end of 5 minutes. 28.8 g of polyethylene was recovered having a molecular weight of 196,000 and a density of 0.958 g/cc.

EXAMPLE 9—Polymerization—Catalyst E

Polymerization was performed as in Example 8 using Catalyst E with no scavenger aluminum compound. 24.0 grams of polyethylene was recovered having a weight average molecular weight of 190,00,, a number average molecular weight of 76,000 and a density of 0.958 g/cc.

EXAMPLE 10—Polymerization—Catalyst F

Polymerization was performed as in Example 7 except that 0.500 grams of Catalyst F was substituted for Catalyst D. 8.1 grams of polyethylene was recovered having a molecular weight of 137,000 and a density of 0.960 g/cc.

What is claimed is:

1. An olefin polymerization supported catalyst comprising the supported reaction product of at least one metallocene of a metal of Group 4b of the Periodic Table and an alumoxane, the aluminum to transition metal molar ratio being in the range of 100:1 to 1:1, said product being formed in the presence of the support, said support being a porous inorganic metal oxide of Group 2a, 3a, 4a, or 4b metal, and wherein the metallocene is employed in the amount of about 0.001 to about 10 millimoles per gram of support.

2. The olefin polymerization supported catalyst in accordance with claim 1 wherein the support is silica.

3. The olefin polymerization supported catalyst in accordance with claim 1 wherein the metallocene is selected from titanium and zirconium metallocenes and mixtures thereof.

4. The olefin polymerization supported catalyst in accordance with claim 1 wherein the alumoxane is methyl alumoxane.

5. The olefin polymerization supported catalyst in accordance with claim 1 wherein the molar ratio is in the range of 50:1 to 5:1.

6. The olefin polymerization supported catalyst in accordance with claim 1 wherein the metallocene is represented by the formulas (I) $(Cp)_m MR_n X_q$
(II) $(C_5R'_k)_g R''_s (C_5R'_k) MQ_{3-g}$ and
(III) $R''_s (C_5R'_k)_2 MQ'$ wherein Cp is a cyclopentadienyl ring, M is a Group 4b transition metal, R is a hydrocarby group or hydrocarboxy having from 1 to 20 carbon atoms, X is a halogen, m=1-3, n=0-3, q=0-3 and the sum of m+n+q is equal to the oxidation state of M, $(C_5R'_k)$ is a cyclopentadienyl or a substituted cyclopentadienyl; each R' is the same or different and is hydrogen or a hydrocarbyl radical selected from alkyl, alkenyl aryl, alkylaryl or arylalkyl radical containing from 1 to 20 carbon atoms, or two carbon atoms are joined together to form a $C_4$-$C_6$ ring, R'' is a $C_1$-$C_4$ alkylene radical, a dialkyl germanium or silicon or an alkyl phosphine or amine radical bridging two $(C_5R'_k)$ rings; Q is a hydrocarbyl radical selected from aryl, alkyl, alkenyl, alkylaryl, or arylalkyl radicals having from 1–20 carbon atoms, hydrocarboxy radical having from 1–20 carbon atoms or halogen and can be the same or different from each other; Q' is an alkylidiene radical having from 1 to about 20 carbon atoms; s is 0 or 1; g is 0, 1, or 2; s is 0 when g is 0; k is 4 when s is 1 and k is 5 when s is 0.

7. The olefin polymerization supported catalyst in accordance with claim 6 wherein the metallocene is selected from bis(cyclopentadienyl) zirconium dichloride, bis(cyclopentadienyl) zirconium methyl chloride, bis(cyclopentadienyl) zirconium dimethyl, bis(methylcyclopentadienyl) zirconium dichloride, bis(methylcyclopentadienyl) zirconium methyl chloride, bis(methylcyclopentadienyl) zirconium dimethyl, bis(pentamethylcyclopentadienyl) zirconium dichloride, bis(pentamethylcyclopentadienyl) zirconium methyl chloride, bis(pentamethylcyclopentadienyl) zirconium dimethyl, bis(n-butyl-cyclopentadienyl) zirconium dichloride, bis(n-butylcyclopentadienyl) zirconium methyl chloride, bis(n-butyl-cyclopentadienyl) zirconium dimethyl, bis(cyclopentadienyl) titanium diphenyl, bis(cyclopentadienyl) titanium dichloride, bis(cyclopentadienyl) titanium methyl chloride, bis(cyclopentadienyl) titanium dimethyl, bis(methylcyclopentadienyl) titanium diphenyl, bis(methylcyclopentadienyl) titanium dichloride, bis(methylcyclopentadienyl) titanium diphenyl, bis(methylcyclopentadienyl) titanium methyl chloride, bis(methylcyclopentadienyl) titanium dimethyl, bis(pentamethylcyclopentadienyl) titanium dichloride, bis(pentamethylcyclopentadienyl) titanium diphenyl, bis(pentamethylcyclopentadienyl) titanium methyl chloride, bis(pentamethylcyclopentadienyl) titanium dimethyl, bis(n-butyl-cyclopentadienyl) titanium diphenyl, bis(n-butyl-cyclopentadienyl) titanium dichloride and mixtures thereof.

8. The olefin polymerization supported catalyst in accordance with claim 7 wherein the metallocene is selected from bis(cyclopentadienyl) zirconium dichloride, bis(n-butyl-cyclopentadienyl) zirconium dichloride and mixtures thereof, the alumoxane is methyl alumoxane and the support is silica.

9. The olefin polymerization supported catalyst in accordance with claim 8 wherein the metallocene is bis(n-butyl-cyclopentadienyl) zirconium dichloride.

10. A method for preparing an olefin polymerization supported catalyst comprising the supported reaction product of at least one metallocene of a metal of Group 4b of the Periodic Table and an alumoxane, the aluminum to transition metal molar ratio being in the range of 100:1 to 1:1, said method comprising adding to a slurry of the support which is a porous inorganic metal oxide of a Group 2a, 3a, 4a, or 4b metal, in an inert hydrocarbon solvent, an alumoxane in an inert hydrocarbon solvent and a metallocene in an amount of from about 0.001 to about 10 millimoles of said metallocene per gram of support.

11. The method in accordance with claim 10 wherein the alumoxane is added to the support material prior to the metallocene.

12. The method in accordance with claim 10 wherein the metallocene is added to the support prior to the alumoxane.

13. The method in accordance with claim 10 wherein the metallocene and alumoxane are added to the support slurry simultaneously.

14. The method in accordance with claim 10 wherein the metallocene is selected from bis(cyclopentadienyl) zirconium dichloride, bis(cyclopentadienyl) zirconium methyl chloride, bis(cyclopentadienyl) zirconium dimethyl, bis(methylcyclopentadienyl) zirconium dichloride, bis(methylcyclopentadienyl) zirconium methyl chloride, bis(methylcyclopentadienyl) zirconium dimethyl, bis(pentamethylcyclopentadienyl) zirconium dichloride, bis(pentamethylcyclopentadienyl) zirconium methyl chloride, bis(pentamethylcyclopentadienyl) zirconium dimethyl, bis(n-butyl-cyclopentadienyl) zirconium dichloride, bis(n-butylcyclopentadienyl) zirconium methyl chloride, bis(n-butyl-cyclopentadienyl) zirconium dimethyl, bis(cyclopentadienyl) titanium diphenyl, bis(cyclopentadienyl) titanium dichloride, bis(cyclopentadienyl) titanium methyl chloride, bis(cyclopentadienyl) titanium dimethyl, bis(methylcyclopentadienyl) titanium diphenyl, bis(methylcyclopentadienyl) titanium dichloride, bis(methylcyclopentadienyl) titanium diphenyl, bis(methylcyclopentadienyl) titanium methyl chloride, bis(methylcyclopentadienyl) titanium dimethyl, bis(pentamethylcyclopentadienyl) titanium dichloride, bis(pentamethylcyclopentadienyl) titanium diphenyl, bis(pentamethylcyclopentadienyl) titanium methyl chloride, bis(pentamethylcyclopentadienyl) titanium dimethyl, bis(n-butyl-cyclopentadienyl) titanium diphenyl, bis(n-butyl-cyclopentadienyl) titanium dichloride, the alumoxane is methyl alumoxane and the support is silica.

15. The method is accordance with claim 14 wherein the metallocene is one of bis(cyclopentadienyl) zirconium dichloride, bis(n-butyl-cyclopentadienyl) zirconium dichloride and mixtures thereof.

16. The method is accordance with claim 14 wherein the metallocene is bis(n-butyl-cyclopentadienyl) zirconium dichloride.

* * * * *